(12) United States Patent
Sato et al.

(10) Patent No.: US 11,465,367 B2
(45) Date of Patent: Oct. 11, 2022

(54) VIBRATION WELDING DEVICE

(71) Applicant: HONDA MOTOR CO., LTD., Tokyo (JP)

(72) Inventors: Koshi Sato, Tokyo (JP); Tetsuro Hosaka, Tokyo (JP); Takahiro Hasuda, Tokyo (JP); Hiroaki Takekata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/571,575

(22) Filed: Jan. 10, 2022

(65) Prior Publication Data

US 2022/0227069 A1 Jul. 21, 2022

(30) Foreign Application Priority Data

Jan. 19, 2021 (JP) .............................. JP2021-006706

(51) Int. Cl.
| | |
|---|---|
| *B29C 65/00* | (2006.01) |
| *B29C 65/78* | (2006.01) |
| *B29C 65/08* | (2006.01) |
| *B29C 65/06* | (2006.01) |

(52) U.S. Cl.
CPC .......... *B29C 65/7802* (2013.01); *B29C 65/08* (2013.01); *B29C 65/7841* (2013.01); *B29C 65/06* (2013.01); *B29C 65/069* (2013.01); *B29C 65/0618* (2013.01); *B29C 66/47* (2013.01)

(58) Field of Classification Search
CPC . B29C 65/7802; B29C 65/06; B29C 65/0618; B29C 65/069; B29C 66/47
See application file for complete search history.

(56) References Cited

U.S. PATENT DOCUMENTS

| | | | |
|---|---|---|---|
| 6,604,668 B2 * | 8/2003 | Crasser | B29C 65/7802 228/2.1 |
| 2009/0211694 A1 * | 8/2009 | Hisai | B29C 65/0618 156/581 |
| 2010/0065613 A1 * | 3/2010 | Nasu | H01L 24/81 228/110.1 |

(Continued)

FOREIGN PATENT DOCUMENTS

| | | |
|---|---|---|
| JP | 3629003 | 7/2003 |
| JP | 2003-267322 | 9/2003 |
| JP | 2016-049549 | 4/2016 |

OTHER PUBLICATIONS

Japanese Office Action for Japanese Patent Application No. 2021-006706 dated Aug. 2, 2022.

*Primary Examiner* — Philip C Tucker
*Assistant Examiner* — Nickolas R Harm
(74) *Attorney, Agent, or Firm* — Amin, Turocy & Watson, LLP (57) ABSTRACT

A vibration welding device includes a base plate, a vibrating body, and a plurality of position adjusting jigs. The vibrating body is capable of vibrating while holding an interior part which is an object to be welded. The base plate is disposed below the vibrating body. The base plate holds an instrument panel which is an object to be welded. The position adjusting jigs are connected to the vibrating body so as to be adjustable in position. The plurality of position adjusting jigs are disposed independently of each other.

4 Claims, 5 Drawing Sheets

(56) References Cited

U.S. PATENT DOCUMENTS

2011/0108184 A1* 5/2011 Cai ................. B23K 20/10
156/580.2
2016/0144557 A1* 5/2016 Moriizumi ........... B29C 66/112
156/580

* cited by examiner

VIBRATION WELDING DEVICE

CROSS-REFERENCE TO RELATED APPLICATIONS

This application is based upon and claims the benefit of priority from Japanese Patent Application No. 2021-006706 filed on Jan. 19, 2021, the contents of which are incorporated herein by reference.

BACKGROUND OF THE INVENTION

Field of the Invention

The present invention relates to a vibration welding device for vibration welding two objects to be welded made of a resin material.

Description of the Related Art

Conventionally, it has been known to join together workpieces made of a resin material using a vibration welding device. The vibration welding device applies a vibration force to two workpieces after the workpieces are brought into abutment with each other. As a result, vibration welding is performed in which the abutment portion of the two workpieces are heated and joined. Specifically, in the vibration welding device, one workpiece is held on the upper surface of a jig placed on the lower side. The other workpiece is held by a vibrating body arranged above the jig. After the one workpiece and the other workpiece are brought into contact with each other by lowering the vibrating body, the other workpiece is vibrated by the vibrating body. As a result, the contact portion between one workpiece and the other workpiece is melted and welded.

When vibration welding is performed by the above-described vibration welding device, there are cases where manufacturing variations occur in workpieces manufactured from a resin material. Therefore, when a workpiece is set in the vibration welding device, it is necessary to perform adjustment according to manufacturing variations. In particular, when a large-sized workpiece is welded by the vibration welding device, the vibrating body and the jig become large in accordance with the workpiece. Therefore, the work for adjusting the positions of the vibrating body and the jig, and the position of the workpiece becomes large-scale. As a result, the adjustment work for the vibrating body and the jig, and the workpiece becomes very complicated, and the time for performing vibration welding increases.

In order to solve such a problem, a vibration welding device disclosed in JP 3629003 B2 includes an upper jig and a base plate. The upper jig is connected to the vibrating body. The base plate is disposed below the upper jig. The base plate is moved in the up-down direction by a raising and lowering drive unit. A material to be welded, which is one workpiece, is arranged and fixed on the upper surface of the base plate. A material to be welded, which is the other workpiece, is suspended from the lower surface of the upper jig.

The vibration welding device includes a first connector, a second connector, and a fastening tool. The first connector is connected to the vibrating body. The second connector is connected to the upper jig. The fastening tool connects the first connector and the second connector to each other. The fastening tool includes a fastening screw rod and a fixing tool. The fastening screw rod extends in the lateral direction. The fixing tool is screwed to the fastening screw rod. The first connector is inserted over the fastening screw rod so as to be movable in the lateral direction. The first connector is moved laterally from the second connector connected to the upper jig. The lateral positions of the vibrating body and the upper jig are adjusted, and after the lateral position of the upper jig is adjusted, the first connector is fixed to the fastening screw rod by the fixing tool for positioning adjustment.

SUMMARY OF THE INVENTION

For example, there are cases where manufacturing variations occur in materials to be welded serving as workpieces, and the direction or magnitude of the manufacturing variations is different in each portion of the welded material. In the above-described vibration welding device, the positional relationship in the width direction between the vibrating body and the upper jig in the width direction can be adjusted over the entire vibration welding device only. That is, in the vibration welding device, the positions of the vibrating body and the upper jig cannot be adjusted for each portion of the material to be welded.

For this reason, it is not possible to adjust the positions of the vibrating body and the upper jig with high accuracy in accordance with the material to be welded in which manufacturing variations have occurred. As a result, when two materials to be welded are vibration welded, the accuracy in welding the materials to be welded is lowered.

An object of the present invention is to solve the above-described problems.

According to the aspect of the present invention, provided is a vibration welding device that vibration welds first and second objects to be welded which are made of a resin material and are stacked together, the vibration welding device comprising: a first jig configured to hold the first object to be welded; a second jig disposed so as to face the first jig and configured to vibrate in a direction substantially orthogonal to a stacking direction of the first and second objects to be welded; and a plurality of position adjusting jigs connected to the second jig, and configured to hold the second object to be welded and transmit vibration of the second jig to the second object to be welded, wherein the plurality of position adjusting jigs are connected to the second jig independently of each other so as to be adjustable in position.

According to the present invention, in the vibration welding device, the plurality of position adjusting jigs are connected to the second jig. The plurality of position adjusting jigs are arranged on the second jig so as to be adjustable in position. The plurality of position adjusting jigs are arranged facing the first jig holding the first object to be welded. Thus, even when the relative position between the vibrating body and the second object to be welded varies due to manufacturing variations of the first and second objects to be welded, the plurality of position adjusting jigs can be moved independently of each other in accordance with the shape or position of the second object to be welded.

As a result, when vibration welding the first and second objects to be welded made of a resin material, the second object to be welded and the vibrating body can be positioned with high accuracy by the plurality of position adjusting jigs. Therefore, it is possible to further improve the welding accuracy when welding the first and second objects to be welded.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
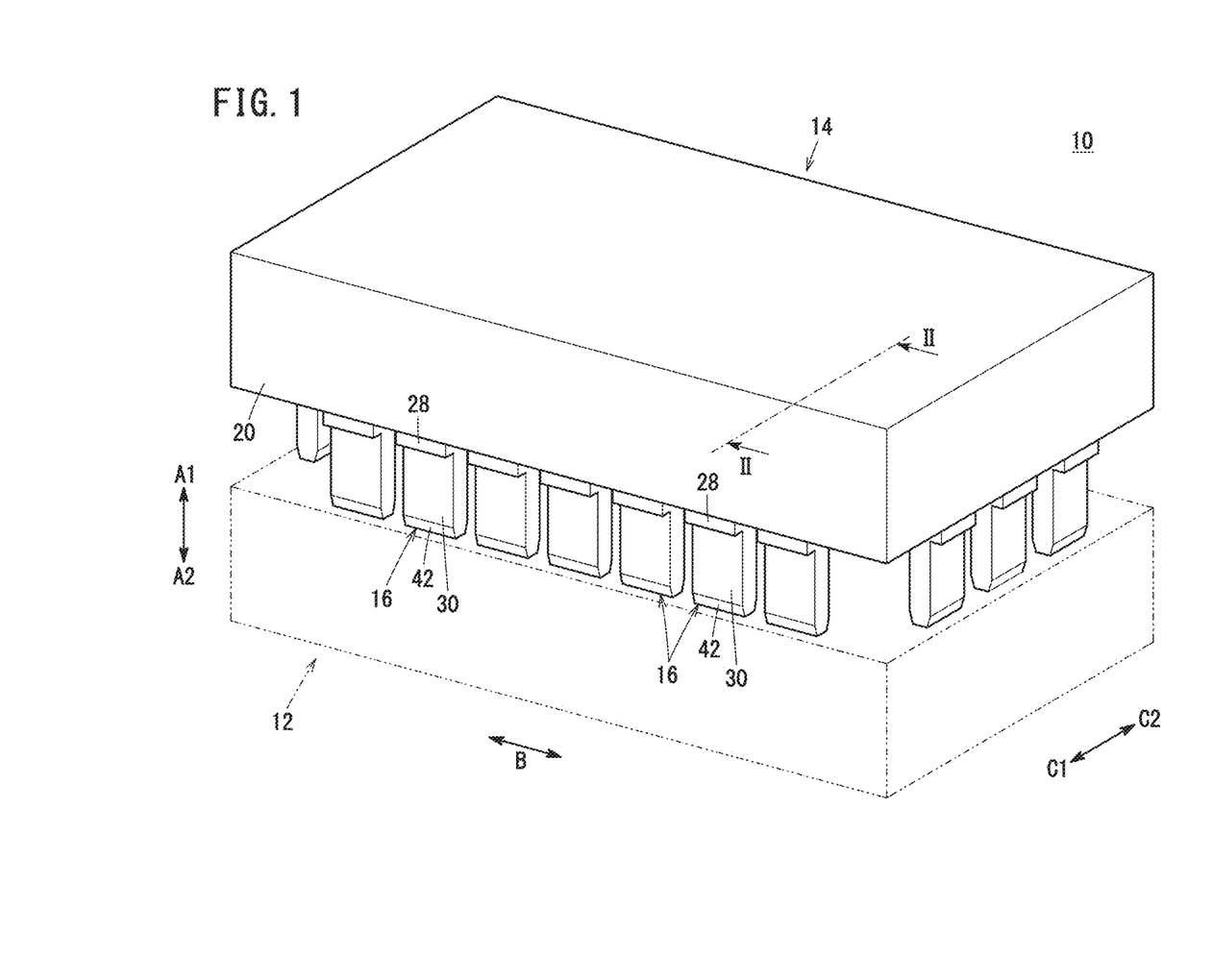
FIG. 1 is an external perspective view of a vibration welding device according to an embodiment of the present invention.
Figure 2:
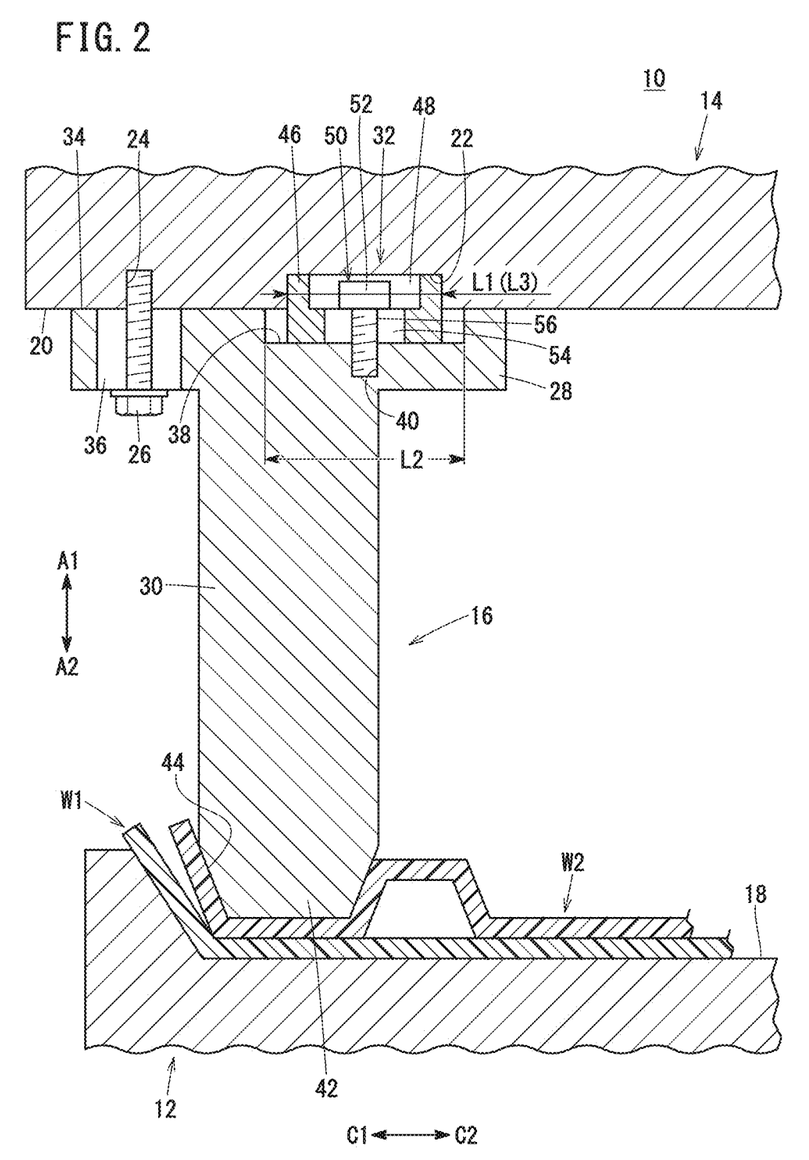
FIG. 2 is a cross-sectional view taken along line II-II of FIG. 1.

As shown in FIGS. 1 and 2, a vibration welding device 10 vibration welds, for example, an interior part (second object to be welded) W2 to an instrument panel (first object to be welded) W1 that is a resin-molded article (resin material). The instrument panel W1 is used in an automobile. The interior part W2 is, for example, an air-conditioning duct used in an automobile. The interior part W2 is also a resin-molded article.

The vibration welding device 10 includes a base plate (first jig) 12, a vibrating body (second jig) 14, and a plurality of position adjusting jigs 16. The base plate 12 is moved in the up-down direction (directions of arrows A1 and A2) by being driven by a raising/lowering device (not shown). The vibrating body 14 is disposed above the base plate 12 (in an arrow A1 direction). The vibrating body 14 vibrates in the horizontal direction (an arrow B direction) by being driven by a vibration generating device (not shown). The position adjusting jigs 16 are movably disposed on the vibrating body 14. The positions of the position adjusting jigs 16 can be adjusted in accordance with the object to be welded (interior part W2). Hereinafter, a description will be given of a case where, in the vibration welding device 10, the instrument panel W1 is mounted on the base plate 12, and the interior part W2 is mounted to the vibrating body 14.

The base plate 12 is a block body. The base plate 12 is elongated in the width direction (the arrow B direction) in accordance with the shape of the instrument panel W1 to be welded. The base plate 12 has a substantially rectangular cross-sectional shape when viewed in the up-down direction. The base plate 12 approaches or separates from the vibrating body 14 by being driven by the raising/lowering device (not shown). That is, the base plate 12 is movable in the up-down direction (the directions of arrows A1 and A2).

An upper surface of the base plate 12 includes a holding surface 18 (see FIG. 2). The instrument panel W1 to be welded is hold on the holding surface 18. For example, the holding surface 18 is recessed downward (in an arrow A2 direction) toward the center of the base plate 12 in the width direction. The holding surface 18 has a substantially U-shaped cross-sectional shape (see FIG. 2). The cross-sectional shape of the holding surface 18 is substantially the same as that of the instrument panel W1. That is, the cross-sectional shape of the holding surface 18 corresponds to the cross-sectional shape of the instrument panel W1.

The cross-sectional shape of the vibrating body 14 is substantially rectangular. The cross-sectional shape of the vibrating body 14 corresponds to the cross-sectional shape of the base plate 12. The vibrating body 14 is connected to the vibration generating device (not shown). A lower surface of an outer edge portion of the vibrating body 14 is arranged facing the base plate 12. The lower surface of the outer edge portion of the vibrating body 14 includes a first contact surface 20. The first contact surface 20 is orthogonal to the moving direction of the base plate 12 (the arrow A direction). The first contact surface 20 is flat. The first contact surface 20 is disposed in a predetermined range from the outer surface toward the inner side of the vibrating body 14.

The first contact surface 20 includes a plurality of first recesses (first key groove) 22 and a plurality of first screw holes 24. Each of the first recesses 22 extends in the horizontal direction (directions of arrows C1 and C2, the longitudinal direction) orthogonal to the width direction of the vibrating body 14 (the arrow B direction). The width direction is a vibration direction of the vibrating body 14. The plurality of position adjusting jigs 16 are respectively connected to the plurality of first recesses 22. The position adjusting jigs 16 protrude downward (in the arrow A2 direction) from the first recesses 22. The number of the first recesses 22 is at least equal to or greater than the number of the position adjusting jigs 16.

Each of the first recesses 22 is recessed upward (in the arrow A1 direction) from the first contact surface 20 by a predetermined depth. The cross-sectional shape of each of the first recesses 22 is an oval shape that is elongated along the horizontal direction (the directions of arrows C1 and C2). Each of the first recesses 22 extends in the longitudinal direction at a constant depth. On the first contact surface 20, the first recesses 22 are arranged in parallel at positions where the position adjusting jigs 16 are mounted.

The first screw hole 24 is disposed outside the first recess 22 on the first contact surface 20. A pair of the first screw holes 24 are disposed on both sides of the first recess 22 in the width direction. The pair of first screw holes 24 are spaced apart from each other by a predetermined distance on both sides of the first recess 22 in the width direction. Each of the first screw holes 24 extends upward (in the arrow A1 direction) from the first contact surface 20. A pair of fastening bolts 26 are screwed into the pair of first screw holes 24 when the position adjusting jig 16 is mounted.

When driven by the vibration generating device (not shown), the vibrating body 14 vibrates horizontally along the width direction of the vibrating body 14 (the arrow B direction). Along with the vibration of the vibrating body 14, the plurality of position adjusting jigs 16 integrally and horizontally vibrate.

As shown in FIGS. 1 to 3A, the cross-sectional shape of each of the position adjusting jigs 16 is, for example, a substantially T shape when viewed in the width direction. The position adjusting jigs 16 each include a mounting flange 28, an arm portion 30, and an adjustment mechanism 32. The mounting flange 28 is connected to the first contact surface 20 of the vibrating body 14. The arm portion 30 extends in a direction (vertical direction) orthogonal to the mounting flange 28. The adjustment mechanism 32 is disposed on the mounting flange 28. The adjustment mechanism 32 can adjust the relative position between the vibrating body 14 and the position adjusting jig 16. For example, the plurality of position adjusting jigs 16 are arranged in parallel in the width direction of the vibrating body 14 (the arrow B direction) (see FIG. 1). Each of the position adjusting jigs 16 is arranged at a position corresponding to a welded portion of the instrument panel W1 and the interior part W2. The number of the position adjusting jigs 16 and the arrangement thereof in the vibrating body 14 are appropriately adjusted in accordance with the shape or position of the objects to be welded.

The mounting flange 28 has a plate shape having a constant thickness. The mounting flange 28 extends in a substantially horizontal direction. The cross-sectional shape of the mounting flange 28 is rectangular when viewed in the extending direction of the arm portion 30. The long side of the mounting flange 28 extends in the horizontal direction (the directions of arrows C1 and C2) orthogonal to the vibration direction of the vibrating body 14. The short side of the mounting flange 28 orthogonal to the long side thereof extends along the vibration direction of the vibrating body 14 (the arrow B direction). An upper surface of the mounting flange 28 includes a second contact surface 34. The second contact surface 34 is flat. The second contact surface 34 abuts against the first contact surface 20 of the vibrating body 14.

Figure 3A:
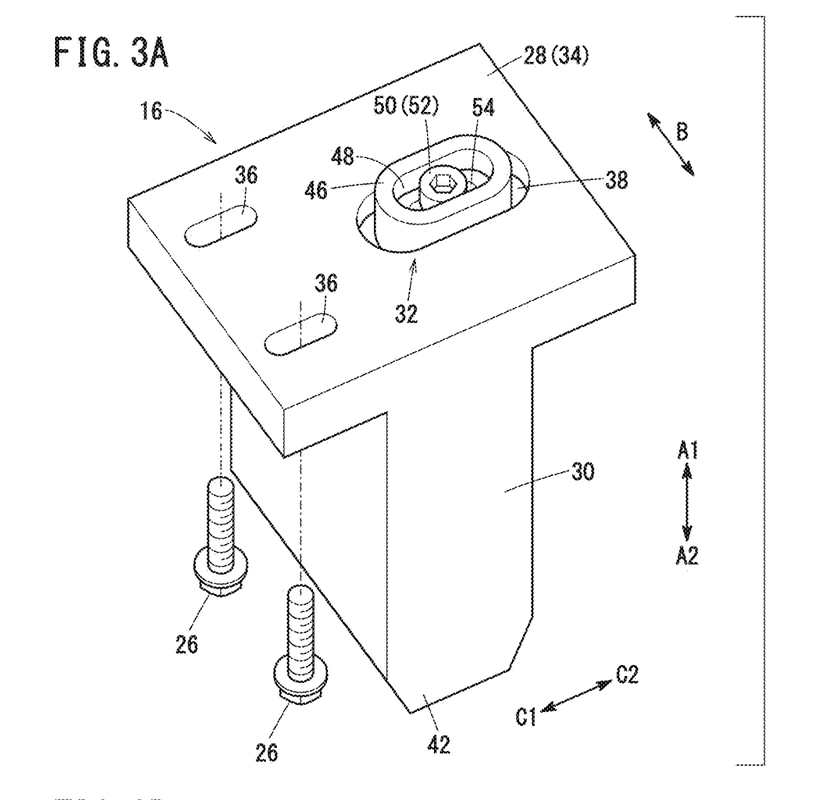
FIG. 3A is an external perspective view of a position adjusting jig constituting the vibration welding device of FIG. 1.
Figure 3B:
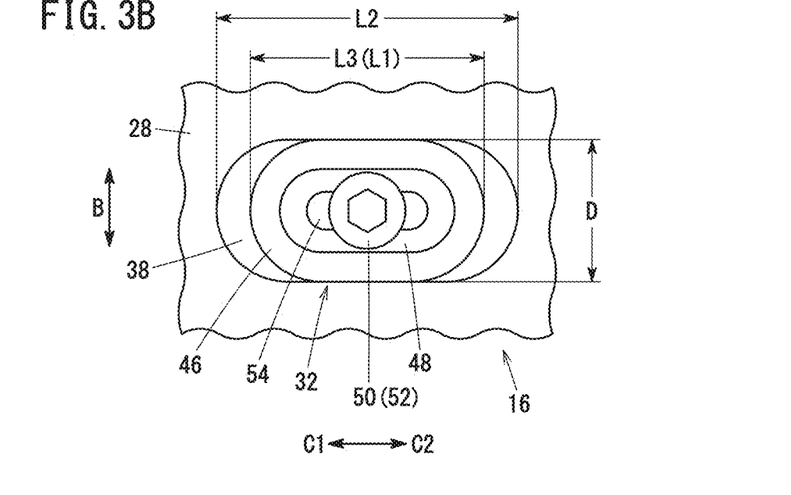
FIG. 3B is an enlarged plan view of the vicinity of a movable key in FIG. 3A.

The mounting flange 28 is provided with a pair of bolt holes 36 as shown in FIGS. 2 and 3A. The pair of bolt holes 36 are disposed in the vicinity of one end of the mounting flange 28 in the horizontal direction, which is the long-side direction of the mounting flange 28 (the directions of arrows C1 and C2). A second recess (second key groove) 38 is provided in the vicinity of the other end of the mounting flange 28 in the horizontal direction. The adjustment mechanism 32 is mounted in the second recess 38. The bolt holes 36 each have an elongated hole shape that is elongated in the long-side direction of the mounting flange 28 (the horizontal direction, the directions of arrows C1 and C2). The bolt holes 36 are spaced apart from each other by a predetermined distance in the short-side direction of the mounting flange 28 (the width direction, arrow B direction). Each of the bolt holes 36 penetrates the mounting flange 28 in the thickness direction of the mounting flange 28 (the directions of arrows A1 and A2). The pitch of the pair of bolt holes 36 along the short-side direction (width direction) is the same as the pitch of the first screw holes 24 in the vibrating body 14 along the width direction.

The fastening bolts 26 are respectively inserted into the bolt holes 36 from below the mounting flange 28. Each of the fastening bolts 26 is screwed into the first screw hole 24 of the vibrating body 14. Thus, the position adjusting jig 16 is fixed to the vibrating body 14 via the mounting flange 28. The position adjusting jig 16 is fixed at a position corresponding to the shape of the interior part W2, which is one of the objects to be welded, or the welding portion.

In other words, the number of the position adjusting jigs 16 is determined according to the shapes of the two objects to be welded or the welding portions. The position adjusting jigs 16 are mounted to and detached from the vibrating body 14 in accordance with the shapes of the two objects to be welded or the welding portions.

As shown in FIGS. 2 to 4B, the second recess 38 is disposed at the center in the short-side direction (center in the width direction) of the mounting flange 28. The second recess 38 is recessed downward (in the arrow A2 direction) from the second contact surface 34 by a predetermined depth. The second recess 38 is elongated in the long-side direction of the mounting flange 28 (the directions of arrows C1 and C2, the longitudinal direction). The second recess 38 has an oval cross-sectional shape and a constant depth.

As shown in FIG. 2, the longitudinal dimension of the second recess 38 along the horizontal direction is defined as L2, and the longitudinal dimension of the first recess 22 of the vibrating body 14 along the horizontal direction is defined as L1. In this case, the longitudinal dimension L2 of the second recess 38 is greater than the longitudinal dimension L1 of the first recess 22 (L2>L1). As shown in the FIG. 3B, a width dimension D of the second recess 38 is a dimension in the horizontal direction orthogonal to the longitudinal direction of the second recess 38. The width dimension D of the second recess 38 is the same as the width dimension of the first recess 22.

As shown in FIG. 2, the bottom surface of the second recess 38 includes a second screw hole (bolt hole) 40. The second screw hole 40 is disposed at the center in the longitudinal direction of the bottom surface of the second recess 38. The second screw hole 40 is disposed at the center in the lateral direction (center in the width direction) of the bottom surface of the second recess 38. The second screw hole 40 extends downward (in the arrow A2 direction). An adjustment screw (bolt) 50 of the adjustment mechanism 32 described later is screwed into the second screw hole 40. When the position adjusting jig 16 is mounted to the first contact surface 20 of the vibrating body 14, the second recess 38 and the first recess 22 are arranged on a straight line in the up-down direction (the directions of arrows A1 and A2).

The arm portion 30 is disposed in the vicinity of the center of the mounting flange 28 in the longitudinal direction. The arm portion 30 is orthogonal to a lower surface of the mounting flange 28. The arm portion 30 extends downward (in the arrow A2 direction). The width dimension of the arm portion 30 is substantially the same as the width dimension of the mounting flange 28 along the short-side direction (the arrow B direction).

The arm portion 30 extends in the up-down direction (the directions of arrows A1 and A2). A lower end of the arm portion 30 includes a pressing end 42. The pressing end 42 is capable of holding the vicinity of an outer edge portion of the interior part W2 to be welded. When viewed in the width direction (short-side direction) of the position adjusting jig 16 shown in FIG. 2, the pressing end 42 has a tapered shape that tapers toward the tip. The tip of the pressing end 42 holds the interior part W2.

When vibration welding between the instrument panel W1 and the interior part W2 is performed by the vibration welding device 10, the pressing end 42 of the arm portion 30 is inserted into a dented portion 44 of the interior part W2 from above. The cross-sectional shape of the pressing end 42 is substantially the same as the cross-sectional shape of the dented portion 44. As a result, the pressing end 42 comes into close contact with the dented portion 44 of the interior part W2 and holds the interior part W2.

As shown in FIGS. 2 to 4B, the adjustment mechanism 32 includes a movable key (key member) 46 and the adjustment screw 50. The movable key 46 is movable along the second recess 38 of the mounting flange 28. The adjustment screw 50 supports the movable key 46 such that the movable key 46 can move in the longitudinal direction of the second recess 38.

The movable key 46 is a block body. The movable key 46 has an oval shape (rectangular shape) that is elongated in the longitudinal direction of the second recess 38 (the directions of arrows C1 and C2). A longitudinal dimension L3 of the movable key 46 is smaller than the longitudinal dimension L2 of the second recess 38 (L3<L2). The longitudinal dimension L3 of the movable key 46 is the same as the longitudinal dimension L1 of the first recess 22 (L3=L1).

The width dimension of the movable key 46 is a dimension in a direction orthogonal to the longitudinal direction of the movable key 46. The width dimension of the movable key 46 is substantially equal to or slightly smaller than the width dimension D of the first and second recesses 22 and 38. A height dimension of the movable key 46 along the up-down direction (the directions of arrows A1 and A2) is substantially equal to or slightly smaller than a depth dimension obtained by adding the depth of the first recess 22 and the depth of the second recess 38.

An upper surface of the movable key 46 includes a housing hole (housing recess) 48. The cross-sectional shape of the housing hole 48 is an oval shape elongated in the longitudinal direction of the movable key 46 (the directions of arrows C1 and C2). The housing hole 48 is recessed downward (in the arrow A2 direction) from the upper surface of the movable key 46 by a predetermined depth. A head portion 52 of the adjustment screw 50 is housed in the housing hole 48. A through hole (elongated hole) 54 is provided at the center of the bottom surface of the housing hole 48. The through hole 54 extends downward. The through hole 54 penetrates the movable key 46. A threaded portion 56 of the adjustment screw 50 is inserted through the through hole 54. The through hole 54 has an elongated hole shape elongated in the longitudinal direction (the directions of arrows C1 and C2) corresponding to the housing hole 48.

A lower portion of the movable key 46 is housed in the second recess 38. An upper portion of the movable key 46 protrudes upward by a predetermined height from the second contact surface 34 of the mounting flange 28. The threaded portion 56 of the adjustment screw 50 is inserted into the housing hole 48 and the through hole 54. The threaded portion 56 is screwed into the second screw hole 40.

Thus, when a part of the movable key 46 is housed in the second recess 38, the movable key 46 is prevented from being removed from the second recess 38 by the adjustment screw 50. When the head portion 52 of the adjustment screw 50 is housed in the housing hole 48, the movable key 46 is movable in the longitudinal direction (the directions of arrows C1 and C2) along the second recess 38. Note that the range of movement of the movable key 46 in the longitudinal direction is from a position where the head portion 52 of the adjustment screw 50 abuts against one end of the housing hole 48 in the longitudinal direction to a position where the head portion 52 abuts against the other end of the housing hole 48 in the longitudinal direction.

That is, the movable key 46 is movable by a predetermined distance in the long-side direction of the mounting flange 28 of the position adjusting jig 16 (in the horizontal direction, the directions of arrows C1 and C2). The movable key 46 is linearly movable along the longitudinal direction. On the other hand, the movable key 46 does not move in the short-side direction of the mounting flange 28 (the width direction, the arrow B direction).

When the position adjusting jig 16 is mounted to the first contact surface 20 of the vibrating body 14, the upper portion of the movable key 46 is housed inside the first recess 22. The cross-sectional shape of the first recess 22 is substantially the same as the cross-sectional shape of the movable key 46. Therefore, when the movable key 46 is inserted into the first recess 22, the movable key 46 and the vibrating body 14 are positioned relative to each other. As a result, the movable key 46 and the vibrating body 14 do not move relative to each other in the longitudinal direction (the directions of arrows C1 and C2) and the width direction (the arrow B direction).

Next, a description will be given of a case where the instrument panel W1 and the interior W2, which are two objects to be welded, are vibration welded by the vibration welding device 10.

First, before vibration welding is performed, the base plate 12 and the vibrating body 14 are separated from each other by a predetermined distance in the up-down direction (the directions of arrows A1 and A2). The fastening bolts 26 that fix the plurality of position adjusting jigs 16 are loosened. As a result, each of the position adjusting jigs 16 can be moved in the horizontal direction (the directions of arrows C1 and C2) along the vibrating body 14 via the movable key 46.

Next, the instrument panel W1 and the interior part W2 are set in the vibration welding device 10. Specifically, as shown in FIG. 2, the instrument panel W1 is placed on the holding surface 18 of the base plate 12 with the convex part of the instrument panel W1 facing downward. At this time, an outer edge portion of the instrument panel W1 is disposed below lower ends of the plurality of position adjusting jigs 16. Thereafter, the interior part W2 is stacked on the outer edge portion of the instrument panel W1 from above.

As a result, the outer edge portion of the instrument panel W1 and the interior part W2 abut against each other (are brought into surface contact with each other). A contact portion between the outer edge portion of the instrument panel W1 and the interior part W2 is a welding portion where the instrument panel W1 and the interior part W2 are welded to each other.

Next, the raising/lowering device (not shown) is driven to raise the base plate 12 toward the vibrating body 14 (in the arrow A1 direction). The dented portion 44 of the interior part W2 approaches the pressing end 42 of each of the position adjusting jigs 16. The pressing end 42 is inserted along the dented portion 44 of the interior part W2. The pressing end 42 is completely inserted into the dented portion 44 and comes into close contact therewith. When there is no manufacturing variation in the interior part W2, the interior part W2 has a desired shape.

Therefore, the interior part W2 is placed at a predetermined position on the instrument panel W1. At this time, as shown in FIG. 2, in the position adjusting jig 16, for example, the movable key 46 is positioned at the center of the second recess 38 in the longitudinal direction.

On the other hand, when there are manufacturing variations in the interior part W2, and the dented portion 44 is not located at a desired position or does not have a desired shape, the pressing end 42 of the position adjusting jig 16 is inserted into the dented portion 44 of the interior part W2. As a result, the pressing end 42 moves in the horizontal direction (the directions of arrows C1 and C2) of the vibrating body 14 according to the position or shape of the dented portion 44.

Figure 4A:
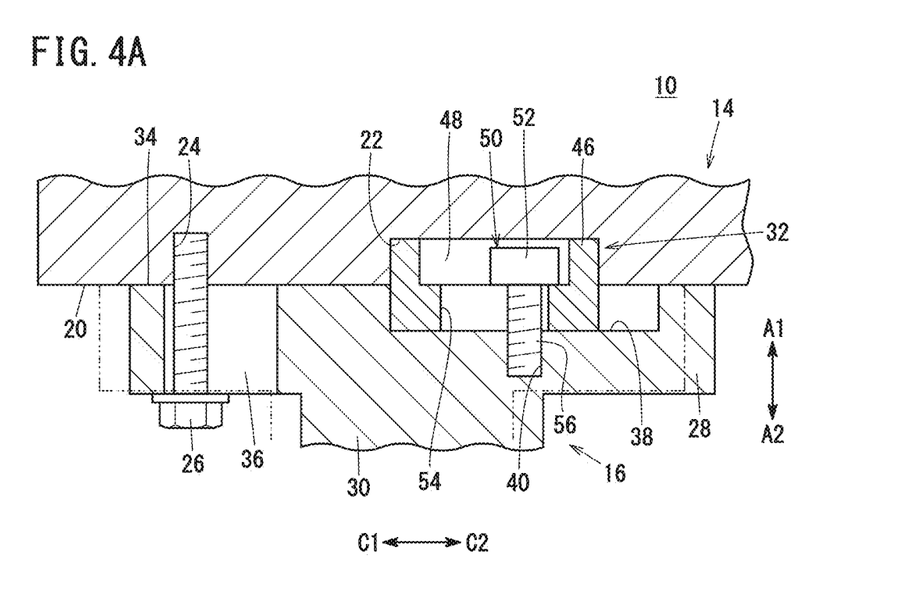
FIG. 4A is an enlarged cross-sectional view showing a state in which the position adjusting jig of FIG. 2 is moved toward the other side in the horizontal direction.

A description will be given of a case where the position of the dented portion 44 in the interior part W2 is shifted, for example, toward the other side in the horizontal direction (in the arrow C2 direction) from a predetermined position, as shown in FIG. 4A.

First, the pressing end 42 of the position adjusting jig 16 is inserted into the dented portion 44. As a result, the position adjusting jig 16 moves toward the other side in the horizontal direction (the arrow C2 direction) via the second recess 38 into which the movable key 46 has been inserted. That is, the position adjusting jig 16 and the movable key 46 move relative to each other in the horizontal direction.

Thus, the adjustment screw 50 moves toward the other side in the horizontal direction within the housing hole 48 and the through hole 54 of the movable key 46. As a result, the movable key 46 is disposed at one end of the second recess 38 in the longitudinal direction (an end portion thereof in the arrow C1 direction). Along with the movement of the position adjusting jig 16, the fastening bolt 26 moves toward one end of the elongated bolt hole 36 in the longitudinal direction.

Figure 4B:
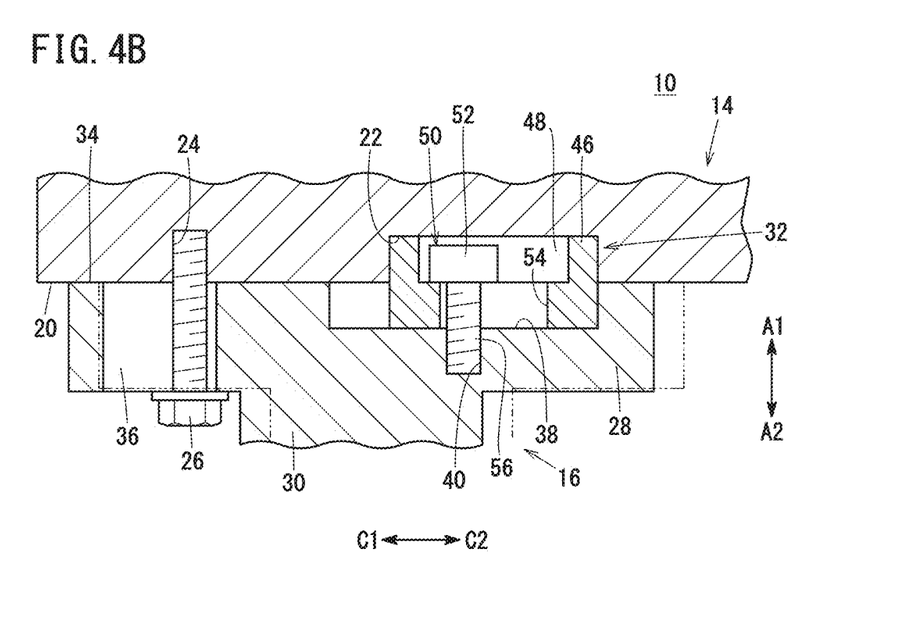
FIG. 4B is an enlarged cross-sectional view showing a state in which the position adjusting jig of FIG. 2 is moved toward one side in the horizontal direction.

Next, a description will be given of a case where the position of the dented portion 44 in the interior part W2 is shifted, for example, toward one side in the horizontal direction (in the arrow C1 direction) from a predetermined position, as shown in FIG. 4B. First, the pressing end 42 is inserted into the dented portion 44. As a result, the position adjusting jig 16 moves toward one side in the horizontal direction (in the arrow C1 direction) via the second recess 38 into which the movable key 46 has been inserted. That is, the position adjusting jig 16 and the movable key 46 move relative to each other in the horizontal direction.

Thus, the adjustment screw 50 moves toward one side in the horizontal direction within the housing hole 48 and the through hole 54 of the movable key 46. As a result, the movable key 46 is disposed at the other end of the second recess 38 in the longitudinal direction (an end portion thereof in the arrow C2 direction). Along with the movement of the position adjusting jig 16, the fastening bolt 26 moves toward the other end of the elongated bolt hole 36 in the longitudinal direction.

That is, in accordance with manufacturing variations in the interior part W2 that is a resin molded article, the position adjusting jig 16 moves in the horizontal direction (the directions of arrows C1 and C2) along the first contact surface 20 of the vibrating body 14 via the movable key 46. As a result, the position adjusting jig 16 can be easily and reliably positioned in the dented portion 44 of the interior part W2. Vibration from the vibrating body 14 can be applied to the position adjusting jig 16 positioned on the interior part W2.

Each of the plurality of position adjusting jigs 16 is positioned with respect to the dented portion 44 of the interior part W2 described above. At this time, a moving direction and a moving amount of each of the position adjusting jigs 16 are different depending on manufacturing variations in each portion of the interior part W2. In other words, each of the plurality of position adjusting jigs 16 is independently movable along the vibrating body 14. Therefore, the positioning of the plurality of position adjusting jigs 16 on the interior part W2 can be adjusted with high accuracy in accordance with manufacturing variations in each portion of the interior part W2.

After the positioning of the plurality of position adjusting jigs 16 and the interior part W2 is completed, the operator screws the fastening bolts 26 of each of the position adjusting jigs 16. Each of the position adjusting jigs 16 is fastened to the vibrating body 14 by the fastening bolts 26. As a result, each of the position adjusting jigs 16 is firmly fixed to the first contact surface 20 of the vibrating body 14 in a state where the position adjusting jig 16 is positioned on the interior part W2.

Finally, the raising/lowering device (not shown) is driven to push the base plate 12 upward. The instrument panel W1 and the interior part W2 are brought into contact with each other between the plurality of position adjusting jigs 16 and the base plate 12. Thereafter, the contact portion between the instrument panel W1 and the interior part W2 is pressed with a predetermined load in the up-down direction.

Then, the vibration generating device (not shown) is driven. As the vibration generating device is driven, the vibrating body 14 and the position adjusting jigs 16 are vibrated in the width direction (the arrow B direction) at a predetermined amplitude and frequency. Thus, the vibration of the vibration generating device is applied from the arm portion 30 of each of the position adjusting jigs 16 to the interior part W2. At the contact portion between the instrument panel W1 and the interior part W2, frictional heat is generated due to the vibration, and the contact portion melts. Next, the driving of the vibration generating device is stopped to cool the contact portion between the instrument panel W1 and the interior part W2. As a result, the resin material melted at the contact portion between the instrument panel W1 and the interior part W2 is solidified, and the contact portion is vibration welded.

The position adjusting jig 16 described above is not limited to the case in which the position adjusting jig 16 includes the adjustment mechanism 32 that can perform adjustment with respect to the vibrating body 14 according to the position or shape of the interior part W2. For example, instead of the movable key 46 in the adjustment mechanism 32, a reference key 60 serving as a reference for positioning the vibrating body 14 and the interior part W2 may be employed in a position adjusting jig 16a.

Figure 5A:
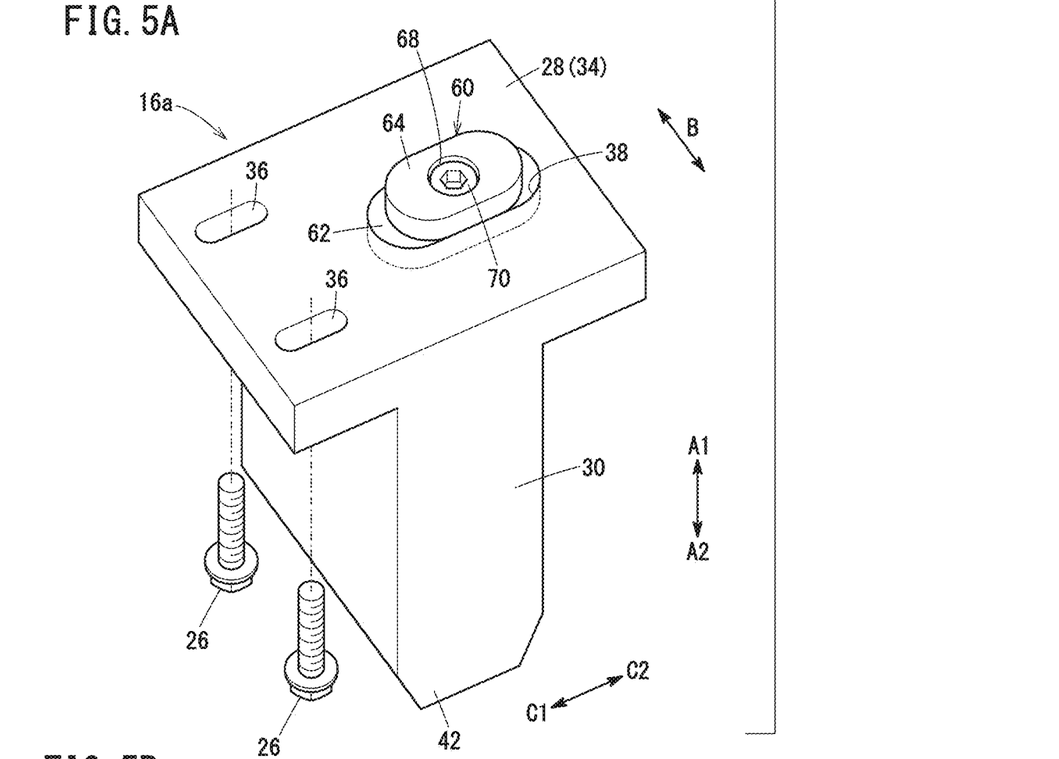
FIG. 5A is an external perspective view of a position adjusting jig in which a reference key is mounted instead of the movable key.
Figure 5B:
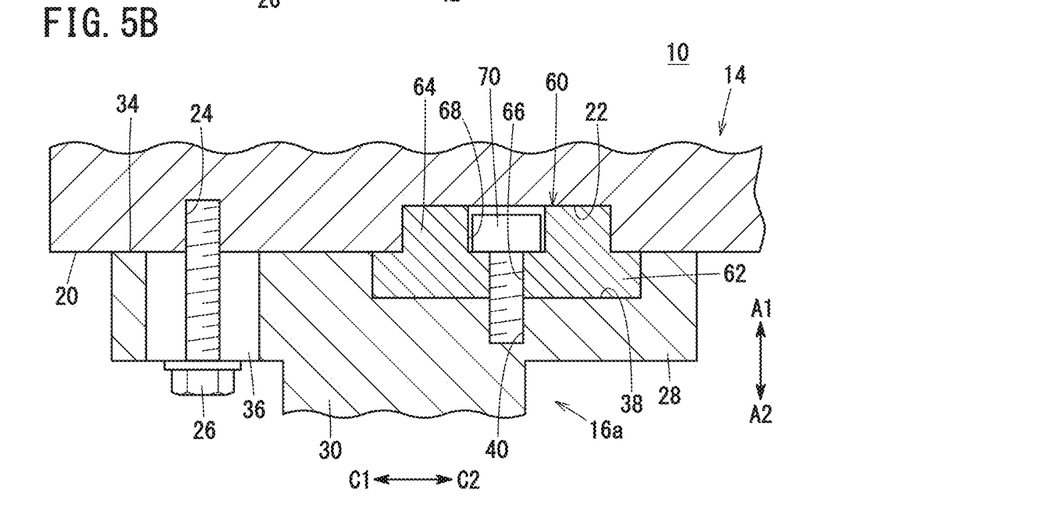
FIG. 5B is an enlarged cross-sectional view showing a state in which the position adjusting jig of FIG. 5A is mounted to a vibrating body.

The reference key 60 is a block body. As shown in FIGS. 5A and 5B, the reference key 60 has an oval shape elongated in the longitudinal direction (the directions of arrows C1 and C2) similarly to the movable key 46. The reference key 60 includes a base portion 62 and a key portion 64. The base portion 62 is disposed in a lower part of the reference key 60. The base portion 62 is inserted into the second recess 38. The key portion 64 is disposed in an upper portion of the base portion 62. The key portion 64 is inserted into the first recess 22 of the vibrating body 14.

The base portion 62 has substantially the same shape as the second recess 38. The base portion 62 is completely housed in the second recess 38. A central portion of the base portion 62 includes a through hole 66. The through hole 66 has a circular cross-sectional shape. The through hole 66 penetrates the base portion 62 in the up-down direction (the directions of arrows A1 and A2).

The key portion 64 has substantially the same shape as the first recess 22. The key portion 64 is completely housed in the first recess 22. A central portion of the key portion 64 includes a housing hole 68. The housing hole 68 opens upward (in the arrow A1 direction) in the key portion 64. The housing hole 68 communicates with the through hole 66.

The base portion 62 of the reference key 60 is housed in the second recess 38 of the position adjusting jig 16a. As a result, the key portion 64 of the reference key 60 protrudes upward from the second contact surface 34 of the mounting flange 28. A fixing bolt 70 is inserted into the housing hole 68 and the through hole 66 of the reference key 60. The fixing bolt 70 is screwed into the second screw hole 40 of the position adjusting jig 16a. As a result, the reference key 60 is fixed to the mounting flange 28 (see FIG. 5A). When the position adjusting jig 16a is mounted to the first contact surface 20 of the vibrating body 14, the key portion 64 of the reference key 60 is housed in the first recess 22.

The base portion 62 of the reference key 60 does not relatively move in the longitudinal direction (the directions of arrows C1 and C2) and the lateral direction (the arrow B direction) of the second recess 38. That is, the reference key 60 and the position adjusting jig 16a do not move relative to each other. The key portion 64 of the reference key 60 does not relatively move in the longitudinal direction and the lateral direction of the first recess 22. That is, the reference key 60 and the vibrating body 14 do not move relative to each other. After the vibrating body 14 and the position adjusting jig 16a are positioned by the reference key 60, the position adjusting jig 16a and the vibrating body 14 are fixed to each other by the fastening bolts 26.

In this manner, by using the reference key 60 instead of the movable key 46, the position adjusting jig 16a can be positioned at a predetermined position on the vibrating body 14. The pressing end 42 of the position adjusting jig 16a is engaged with the dented portion 44 of the interior part W2. Thus, the reference key 60 serves as a reference for positioning the interior part W2 and the vibrating body 14.

As described above, in the present embodiment, the vibration welding device 10 includes the plurality of position adjusting jigs 16 mounted to the vibrating body 14. Each of the position adjusting jigs 16 is arranged facing the base plate 12 holding the instrument panel W1. The position adjusting jigs 16 transmit the vibration of the vibrating body 14 to the interior part W2 and the instrument panel W1. The plurality of position adjusting jigs 16 are connected to the vibrating body 14 independently of each other so as to be adjustable in position.

Manufacturing variations may occur in the interior part W2 that is a resin molded article. Due to the manufacturing variations in the interior part W2, the relative position between the interior part W2 and the vibrating body 14 may vary. At this time, the plurality of position adjusting jigs 16 are moved in the horizontal direction independently of each other according to the shape or position of the interior part W2. Thus, the position adjustment between the vibrating body 14 and the interior part W2 can be easily and reliably performed by the plurality of position adjusting jigs 16.

As a result, when the instrument panel W1 and the interior part W2, which are resin molded articles, are vibration welded, the vibrating body 14 can be positioned with respect to the interior part W2 with high accuracy by the plurality of position adjusting jigs 16. Therefore, in the vibration welding device 10, it is possible to reliably weld the instrument panel W1 and the interior part W2 with improved welding accuracy.

The plurality of position adjusting jigs 16 are adjustable in position in the horizontal direction (the directions of arrows C1 and C2) orthogonal to the vibration direction of the vibrating body 14 (the width direction, the arrow B direction). Accordingly, the positions of the plurality of position adjusting jigs 16 can be adjusted in a direction (horizontal direction) in which the position adjusting jigs 16 are not moved by vibration. Therefore, it is possible to weld the instrument panel W1 and the interior part W2 with further improved welding accuracy.

The vibrating body 14 includes the first contact surface 20, and the position adjusting jigs 16 each include the second contact surface 34. The first contact surface 20 and the second contact surface 34 are brought into contact with each other. The movable key 46 is disposed in the first and second contact surfaces 20 and 34. The first contact surface 20 includes the first recess 22. The longitudinal dimension L1 of the first recess 22 is the same as the longitudinal dimension of the movable key 46 along the longitudinal direction. The second contact surface 34 includes the second recess 38. The longitudinal dimension L2 of the second recess 38 is greater than the longitudinal dimension L1 of the first recess 22. The movable key 46 is engaged with the first recess 22 and the second recess 38.

Accordingly, before vibration welding of the instrument panel W1 and the interior part W2 is performed, the movable key 46 can be positioned in advance in accordance with the shape or position of the interior part W2. Therefore, when the position adjusting jig 16 is aligned with the interior part W2, positional deviation between the position adjusting jig 16 and the interior part W2 is prevented.

In the position adjusting jig 16, the bottom surface of the second recess 38 is provided with the second screw hole 40. The adjustment screw 50 is screwed into the second screw hole 40. The adjustment screw 50 supports the movable key 46 such that the position of the movable key 46 can be adjusted in the horizontal direction along the second recess 38. The upper surface of the movable key 46 is arranged facing the first recess 22 of the vibrating body 14. The upper surface of the movable key 46 includes the through hole 54 and the housing hole 48. The through hole 54 has an elongated hole shape, and the threaded portion 56 of the adjustment screw 50 is inserted into the through hole 54. The housing hole 48 and the through hole 54 communicate with each other. The head portion 52 of the adjustment screw 50 can be housed in the housing hole 48.

Therefore, the movable key 46 is engaged with the first recess 22 of the vibrating body 14. The adjustment screw 50 is movable along the housing hole 48 and the through hole 54 of the movable key 46. As a result, the position adjusting jig 16 can be moved along the first contact surface 20 of the vibrating body 14 so as to be adjustable in position in the horizontal direction.

Note that the present invention is not limited to the embodiments described above, and various configurations can be adopted therein without departing from the gist of the present invention.

What is claimed is:

1. A vibration welding device that vibration welds first and second objects to be welded which are made of a resin material and are stacked together, the vibration welding device comprising:
   a first jig configured to hold the first object to be welded;
   a second jig disposed so as to face the first jig and configured to vibrate in a direction substantially orthogonal to a stacking direction of the first and second objects to be welded; and
   a plurality of position adjusting jigs connected to the second jig, and configured to hold the second object to be welded and transmit vibration of the second jig to the second object to be welded, wherein
   the plurality of position adjusting jigs are connected to the second jig independently of each other so as to be adjustable in position.

2. The vibration welding device according to claim 1, wherein
   the position adjusting jigs are adjustable in position in a direction orthogonal to the stacking direction and to a vibration direction of the second jig.

3. The vibration welding device according to claim 1, wherein
   the second jig includes a first contact surface,
   the position adjusting jigs each include a second contact surface configured to come into contact with the first contact surface,
   a key member having a rectangular shape and engaged with the second jig and each of the position adjusting jigs is disposed in the first and second contact surfaces, and one of the first and second contact surfaces includes a first key groove having a same longitudinal dimension as the key member in a longitudinal direction of the key member, and another of the first and second contact surfaces includes a second key groove longer than the first key groove in the longitudinal direction.

4. The vibration welding device according to claim 3, wherein a bottom surface of the second key groove includes a bolt hole into which a bolt is fitted, the bolt being configured to fix the key member to the second key groove in a manner that a position of the key member is adjustable, and the key member includes an elongated hole through which the bolt is inserted, and a housing recess communicating with the elongated hole and configured to house a head portion of the bolt.

* * * * *